United States Patent
Stiebitz

(10) Patent No.: US 9,181,970 B2
(45) Date of Patent: Nov. 10, 2015

(54) DRILLING SCREW

(75) Inventor: Guenter Stiebitz, Waldenburg (DE)

(73) Assignee: SWG Schraubenwerk Gaisbach GmbH, Waldenburg (DE)

(*) Notice: Subject to any disclaimer, the term of this patent is extended or adjusted under 35 U.S.C. 154(b) by 491 days.

(21) Appl. No.: 13/502,562

(22) PCT Filed: Sep. 27, 2010

(86) PCT No.: PCT/EP2010/064249
§ 371 (c)(1),
(2), (4) Date: Jul. 18, 2012

(87) PCT Pub. No.: WO2011/047933
PCT Pub. Date: Apr. 28, 2011

(65) Prior Publication Data
US 2012/0303074 A1 Nov. 29, 2012

(30) Foreign Application Priority Data
Oct. 23, 2009 (DE) .................... 10 2009 045 951

(51) Int. Cl.
F16B 25/10 (2006.01)
F16B 25/00 (2006.01)

(52) U.S. Cl.
CPC ........... *F16B 25/103* (2013.01); *F16B 25/0015* (2013.01); *F16B 25/0084* (2013.01)

(58) Field of Classification Search
CPC . F16B 25/103; F16B 25/0015; F16B 25/0084
See application file for complete search history.

(56) References Cited

U.S. PATENT DOCUMENTS

| | | | | |
|---|---|---|---|---|
| 3,665,801 | A * | 5/1972 | Gutshall | 411/387.7 |
| 3,710,676 | A * | 1/1973 | Ringland | 411/387.7 |
| 3,827,331 | A | 8/1974 | Muenchinger | |
| 4,016,795 | A * | 4/1977 | Gill | 411/387.8 |
| 4,028,987 | A * | 6/1977 | Wilson | 411/387.2 |
| 4,034,641 | A * | 7/1977 | Williams et al. | 411/387.7 |
| 4,257,307 | A * | 3/1981 | Regensburger | 411/387.1 |
| 4,407,620 | A * | 10/1983 | Shinjo | 411/387.7 |
| 4,583,898 | A * | 4/1986 | Sygnator | 411/387.7 |
| 4,645,396 | A * | 2/1987 | McCauley et al. | 411/387.2 |
| 5,141,376 | A | 8/1992 | Williams | |
| 6,698,987 | B1 | 3/2004 | Dicke | |
| 7,090,452 | B2 * | 8/2006 | Chen | 411/387.1 |

(Continued)

FOREIGN PATENT DOCUMENTS

| DE | 9108998 U1 | 7/1991 |
|---|---|---|
| DE | 297 11 128 U1 | 8/1997 |

(Continued)

*Primary Examiner* — Gary Estremsky
(74) *Attorney, Agent, or Firm* — Boyle Fredrickson, S.C.

(57) ABSTRACT

A drilling screw contains on its front end facing away from the screw head a drill bit having two drilling cutters. At an axial distance from the drilling cutters the screw shank has a constriction, within which the diameter of the screw shank is smaller than the diameter of the hole produced by the drill bit. The constriction is configured such that it has a shoulder running almost transversely to the longitudinal axis and facing the screw head and from which the diameter gradually approaches again the core diameter of the shank. Within this constriction begins the thread, wherein the thread edge initially has a distance from the longitudinal axis of the screw which corresponds roughly to the radius of the hole. The thread edge then runs along a spiral up to the final outer diameter of the thread on the shank.

7 Claims, 1 Drawing Sheet

(56) References Cited

U.S. PATENT DOCUMENTS

| | | |
|---|---|---|
| 7,699,569 B2 * | 4/2010 | Su .................... 411/387.1 |
| 7,934,895 B2 * | 5/2011 | Ernst et al. .................... 411/44 |
| 2007/0116540 A1 * | 5/2007 | Su .................... 411/387.1 |
| 2007/0134072 A1 * | 6/2007 | Su .................... 411/387.1 |
| 2008/0080951 A1 * | 4/2008 | Lin .................... 411/387.6 |
| 2009/0142159 A1 | 6/2009 | Wolpert |
| 2010/0119327 A1 * | 5/2010 | Lin .................... 411/387.8 |

FOREIGN PATENT DOCUMENTS

| | | |
|---|---|---|
| DE | 19803672 A1 | 8/1999 |
| EP | 1445498 A1 | 8/2004 |
| FR | 1428786 A | 2/1966 |
| GB | 1003888 A | 9/1965 |

* cited by examiner

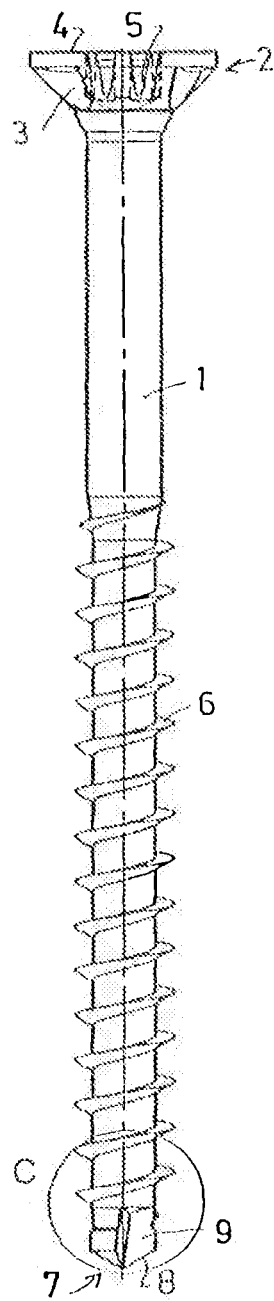
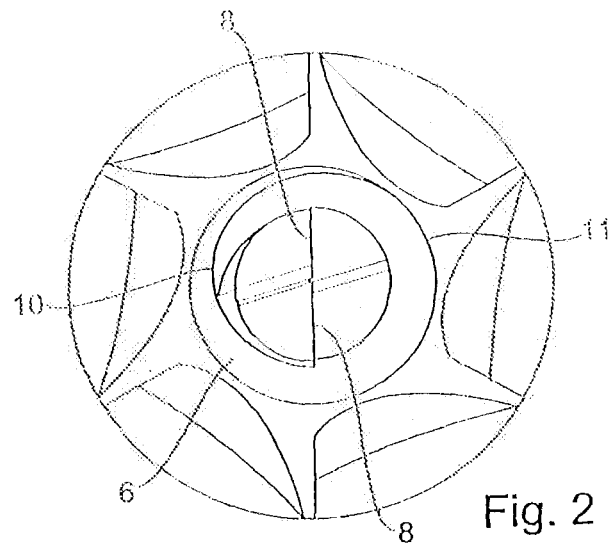
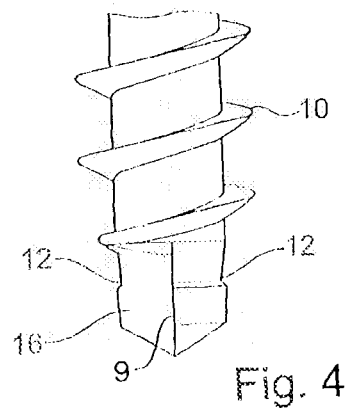
FIG. 1
Fig. 2
FIG. 3
Fig. 4

DRILLING SCREW

The invention is based on a drilling screw.

Drilling screws have long been known. They have the advantage that it is possible to screw into wood or wood-like material without pre-drilling.

There are self-drilling screws which have a genuine screw tip. Here an attempt is made to configure the screw thread up to the tip itself in order that the screw can itself generate the forward feed motion as quickly as possible.

In the case of somewhat harder materials, for instance laminated boards made of wood-like material, use is also made of drilling screws with a tip which has cutting edges and drills a hole. This hole must, of course, be smaller than the outer diameter of the thread of the screw.

It has now transpired that when screwing, in particular, into laminated boards, there is the danger that the upper layer of the board, for instance the lamination, is removed. This can lead, under some circumstances, to shoddy results.

The object of the invention is to provide a drilling screw which, even under unfavorable conditions, results in a fast screw-in without the danger of the upper layer of the board into which the screw is screwed being removed.

For the achievement of this object, the invention proposes a drilling screw having the features stated in claim 1. Refinements of the invention are the subject of the subclaims.

The drilling screw initially generates with its drill bit a hole in the surface of the board. Only once this hole has reached a certain depth does the thread enter into engagement with the rim of the hole. At this point, the thread has not yet, however, reached its final shaping or its final outer diameter. There is therefore no longer a danger of the thread removing the surface. It should here be borne in mind that the feed motion in respect of a drill bit is initially less than that corresponding to the pitch of the thread.

In one refinement of the invention, it can be provided that the radial distance of the thread edge, starting from the beginning of the thread, increases over one to two windings up to the final outer diameter.

In another refinement of the invention, it can be provided that behind the drill bit is configured a constriction in which the diameter of the screw is smaller than that corresponding to the drill bit, i.e. smaller than the hole which is produced by the drill bit.

The invention here now proposes that the thread begins within this constriction. This has the effect that the thread makes contact with the material into which the screw is screwed firstly with the wall of the already made blind hole, that is to say also at a distance from the surface of the board.

The constriction can be configured, in particular, non-symmetrically, for instance in such a way that a shoulder directed in the direction of the screw head is present, and that, starting from the end of the shoulder, the diameter slowly widens conically in the direction of the screw head. This makes the configuration of the thread of increasing diameter particularly sensible.

In yet another refinement of the invention, it can be provided that the radial distance of the thread edge from the longitudinal axis of the screw at the beginning of the thread is smaller than or equal to the diameter of the hole to be produced by the drill bit. The thread thus first makes contact within the hole with the wall of the hole at a distance from the surface of the board.

The later thread windings then gradually widen the thread in the wall of the hole. The danger of the removal of chips on the surface of the board, or of a lamination on the surface of the board, is thereby eliminated.

In front of the cutting edges of the drill bit are formed flanks, which serve to carry off chips generated in the drilling. According to the invention, it can now be provided in one refinement that the flank in front of the cutting edge reaches into the region of the constriction and, where necessary, a bit further.

Since the drill bit of the screw is produced by a cold forming operation, the invention in one refinement proposes that the flank in front of the cutting edge of the drill bit lies in a longitudinal center plane of the screw.

According to the invention, the screw can have a countersunk head, preferably with milling pockets on its bottom side.

Further features, details and advantages of the invention emerge from the claims and the abstract (the wording of both of which is made by reference to the content of the description), the following description of preferred embodiments of the invention and also with reference to the drawing, wherein:

FIG. 1 shows a side view of a countersunk head screw according to the invention;

FIG. 2 shows an end view of the screw from below in FIG. 1, on an enlarged scale;

FIG. 3 shows the drill bit from a first direction, on an enlarged scale compared to FIG. 1;

FIG. 4 shows a view of the front end of the screw from a direction which is offset by 90° in relation to FIG. 3.

In FIG. 1, a drilling screw according to the invention is represented. The drilling screw contains a shank 1, on one end of which is configured a screw head 2. This screw head is constituted by a countersunk head having milling pockets 3 on its bottom side. Starting from the flat end face 4 of the screw head 2, a screw drive recess 5 leads into the screw head 2.

The screw shank 1 has a first, threadless region starting from the bottom side of the screw head 2, and a second region having a thread 6. On that end of the screw shank 1 which is facing away from the screw head 2 is formed a drill bit 7, which in FIG. 1 can be seen from a first direction. The drill bit 7 has two drilling cutters 8. In front of each drilling cutter 8 is formed a flank 9, which, on the one hand, forms the cutting edge 8 and, on the other hand, enables the evacuation of chips generated in the drilling. The outer diameter of the drill bit 7 corresponds roughly to the core diameter of the screw thread 6.

From FIG. 2, which represents the drill bit from the front, it can be seen that two such drilling cutters 8 are present, which drilling cutters lie in end view at least approximately in a line. Directly at the flank 9 lying in front of the lower drilling cutter 8 begins the thread 6. It there has a distance from the screw longitudinal axes which corresponds approximately to the diameter of the hole to be drilled by the drill bit 8. The thread edge 10 lies on a spiral, which, within about one convolution, widens into the outer diameter 11 of the thread 6.

FIG. 3 now shows the drill bit on a scale which is enlarged in relation to FIG. 1. At a distance from the point of intersection of the two drilling cutters 8, which distance is somewhat smaller than the diameter of the screw, the cross section of the screw narrows and there forms a constriction 12. Behind the secondary cutting edge 13 of the drill bit 7 is formed a shoulder 14, which runs almost transversely to the longitudinal axis and from which then the cross section of the screw shank conically gradually approaches again the full diameter of the screw shank 1 or the core diameter of the thread 6.

Within this constriction 12 begins the thread 6. It begins with an end face, which lies in a plane with the flank 9. This could also be referred to as a tooth. After half a revolution, the radial distance of the thread edge 10 from the longitudinal axis of the screw has already become significantly greater, but has not yet reached the outer diameter 11 of the thread 6. This only happens in the further progression of the thread edge, see FIG. 2.

The chip notch formed by the flank 9 is limited by a second face 16, which is likewise of flat configuration, wherein the angle between the two faces 9, 16 is somewhat greater than a right angle.

FIG. 4 now shows the front end of the screw from a 90°-offset direction, from the left in FIG. 3. Here, the constriction 12 is likewise clearly visible. Likewise, it can here be seen how the thread edge 10 of the thread 6 gradually approaches the final outer diameter 11 of the thread 6.

A drilling screw contains on its front end facing away from the screw head a drill bit having two drilling cutters. At an axial distance from the drilling cutters the screw shank has a constriction, within which the diameter of the screw shank is smaller than the diameter of the hole produced by the drill hit. The constriction is configured such that it has a shoulder running almost transversely to the longitudinal axis and facing the screw head and from which the diameter gradually approaches again the core diameter of the shank. Within this constriction begins the thread, wherein the thread edge, initially, has a distance from the longitudinal axis of the screw which corresponds roughly to the radius of the hole. The thread edge then runs along a spiral up to the final outer diameter of the thread on the shank.

The invention claimed is:

1. A drilling screw, comprising
   a screw shank,
   a drill bit, configured on a front end of the screw shank, the drill bit having two cutting edges,
   a screw thread, which begins at an axial distance behind the cutting edges, and which has a thread edge, and
   in which a radial distance of the thread edge from a longitudinal axis of the screw increases from a beginning of the thread,
   wherein a constriction is configured behind the drill bit, in which a diameter of the screw is smaller than a hole formed by the drill bit and is smaller than a core diameter of the screw shank, the screw shank core diameter being otherwise constant in an area of the screw shank including the screw thread,
   wherein an outer diameter of the drill bit equals a core diameter of the screw thread,
   further wherein the screw thread begins within the constriction.

2. The drilling screw as claimed in claim 1, wherein the radial distance of the thread edge increases over a range from one half to two windings.

3. The drilling screw as claimed in claim 1, wherein the constriction is of non-symmetrical configuration.

4. The drilling screw as claimed in claim 1, wherein the radial distance of the thread edge from the longitudinal axis of the screw at the beginning of the thread is smaller than or equal to a diameter of a hole to be produced by the drill bit.

5. The drilling screw as claimed in claim 1, wherein in front of the cutting edge a flank reaches from the drill bit into a region of the constriction.

6. The drilling screw as claimed in claim 1, wherein the cutting edge of the drill bit has a flank that lies in a longitudinal center plane of the screw.

7. The drilling screw as claimed in claim 1, comprising a screw head configured as a countersunk head.

* * * * *